United States Patent [19] [11] 4,041,801
Anderson [45] Aug. 16, 1977

[54] MECHANISM OF IMPROVING THE REGULATION OF ROTARY POWER SOURCES SUBJECT TO INTERMITTENT SHORT TERM OVERLOAD

[76] Inventor: Warren A. Anderson, 1874 Main Road, Tiverton, R.I. 02878

[21] Appl. No.: 651,014

[22] Filed: Jan. 21, 1976

[51] Int. Cl.[2] .......... F16D 67/00; F16F 15/10

[52] U.S. Cl. .......... 74/572; 192/41 S; 192/48.92; 64/30 R; 74/574

[58] Field of Search .......... 192/48.3, 41 S, 48.92; 74/572, 574; 64/30 R

[56] References Cited

U.S. PATENT DOCUMENTS

| | | | |
|---|---|---|---|
| 1,158,555 | 11/1915 | Prescott | 74/574 X |
| 1,273,952 | 7/1918 | Tibbetts | 74/574 |
| 2,055,803 | 9/1936 | Rafter | 192/48.92 X |
| 2,527,830 | 10/1950 | Lilja | 74/574 |
| 2,685,949 | 8/1954 | Dunlap | 192/41 S |
| 2,737,274 | 3/1956 | Mouravieff | 192/41 S |

*Primary Examiner*—Allan D. Herrmann
*Attorney, Agent, or Firm*—Richard S. Sciascia; Arthur A. McGill; Prithvi C. Lall

[57] ABSTRACT

A power system has a flywheel coupled to a power shafting so that when the rotational velocity of the shaft increases the flywheel is slowly accelerated to shaft speed. During this period a loose friction drive coupling the flywheel to the shaft is utilized. At periods when overloading of the system occurs, the shaft will tend to slow down. However, due to inertia, the flywheel tends to maintain velocity as the shaft speed diminishes. During this period an overriding clutch, incorporated in the flywheel hub couples the energy stored in the flywheel to the power shafting, temporarily supplementing the prime power source.

2 Claims, 4 Drawing Figures

MECHANISM OF IMPROVING THE REGULATION OF ROTARY POWER SOURCES SUBJECT TO INTERMITTENT SHORT TERM OVERLOAD

STATEMENT OF GOVERNMENT INTEREST

The invention described herein maybe manufactured and used by or for the Government of the United States of America for governmental purposes without the payment of any royalties thereon or therefore.

BACKGROUND OF THE INVENTION

The present invention generally relates to the improvement of the regulation of rotary power sources subject to intermittent short term overloads. Examples of such mechanisms are auxiliary generator systems including internal combustion engines driving electrical generators, rotary frequency changers having electric motors driving a generator of a different frequency, and motor driven earth augers encountering dense layers.

Prior systems solved the problem of intermittent short term overload by designing the machine or mechanism on the basis of the peak power required. This produces an overdesigned device for the majority of operations. Other systems provided backup generating equipment to be switched into service during such peak power requirements, and some systems simply ignored the problem and hoped for the best.

SUMMARY OF THE INVENTION

Accordingly, it is a general purpose and object of the present invention to provide an improved rotary driven system that is subjected to intermittent overloads. It is a further object of the invention that the improvement comprise means for maintaining a substantially constant velocity of the rotated member. Additional objects are that the improvement be low in cost, rugged, durable and dependable in operation. These and other objects of the invention and the various features and details of construction and operation will become apparent from the specification and drawings.

The above objects are obtained by providing a rotary driven power system having a shaft that is driven at a predetermined rotary speed. An inertial element having a slidable friction coupling to the shaft is utilized. The slidable coupling prevents an overload from occurring in the system during the startup period by permitting the inertial element to be slowly brought up to speed. The element is further connected to the system in a manner that should an overload occur after the element is brought to speed, that would cause the shaft speed to diminish, an automatic clutch operation develops securing the element to the shaft, thereby, supplementing the input power on the shaft and substantially maintaining a constant rotary speed of the shaft.

DESCRIPTION OF THE PREFERRED EMBODIMENTS

Figure 1:
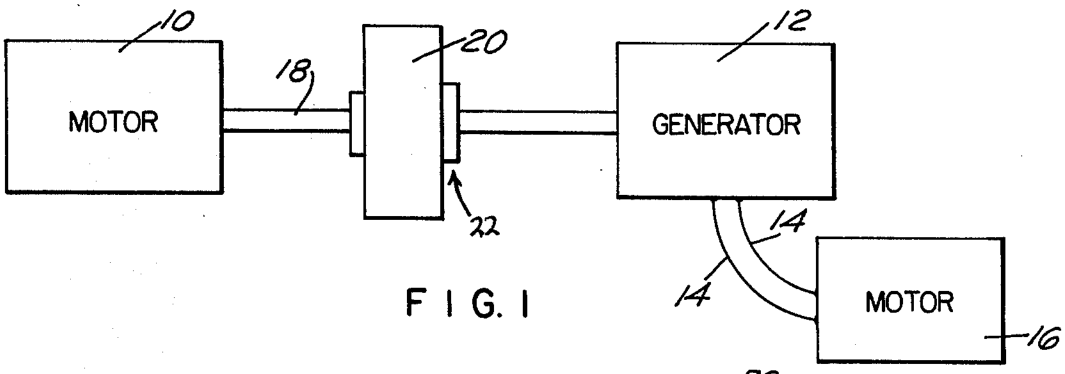
FIG. 1 shows a first embodiment of the present invention.

Referring now to FIG. 1 there is shown a typical motor 10 coupled to drive a generator 12. The generator 12 is connected by electrical wires 14 to a load such as a motor 16. The coupling element between the motor 10 and the generator 12 is a power shaft 18. An inertial element such as a flywheel 20 is coupled to the power shaft 18, by a special hub 22, in such a way that if the shaft 18 turns faster than the flywheel 20, the flywheel 20 will be slowly accelerated to shaft speed. Herein, a loose friction drive is visualized. In addition the special hub 22 contains an overriding clutch. On the occasion when the flywheel 20 tends to run faster than the power shafting 18, such as happens during monentary overload, the overriding clutch couples the flywheel 20 fixedly to the shaft 18 thereby supplying additional energy for supplementing the driving power from the motor 10.

Figure 2:
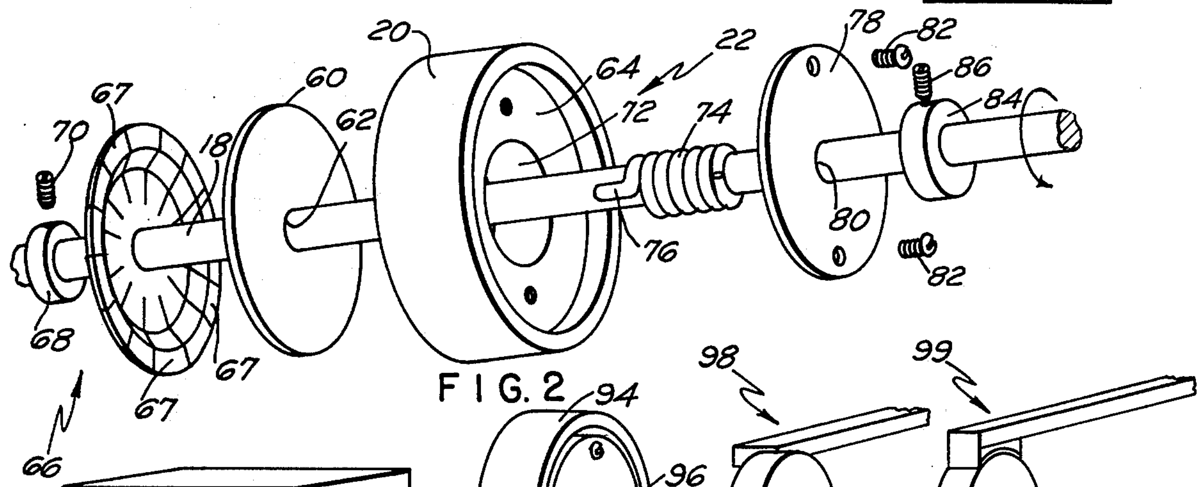
FIG. 2 is a sectionalized partially exploded view of the special hub and flywheel of FIG. 1.

FIG. 2 shows a view of special hub 22 and flywheel 20. For ease in understanding the components of hub 22 an exploded view along shaft 18 is shown. The special hub 22 has a disc 60 with a bearing surface 62 so as to be able to rotate about shaft 18. The disc 60 abuts inner extension 64 of flywheel 20 and can be fixedly mounted to extension 64 or form a slidable frictional coupling. A spring split washer 66 with fingers 67 has a cylindrical collar 68 affixed to it that is rigidly mounted to shaft 18 by means of a set screw 70. The fingers 67 abut and form frictional coupling with disc 60. The internal extension 64 of flywheel 20 has a cylindrical hollow with a wall 72 in which a spring wire 74 is inserted and affixed to the flywheel 20 at end 76 of spring 74 in any known manner. A plate 78 having a bearing surface 80 is affixed to inner extension 64 by means of screws 82. A collar 84 is rigidly affixed to shaft 18 by means of set screw 86. The plate 78 and collar 84 are in rotary sliding relationship to each other. The spring 74 is located between disc 60 and plate 78 and touches neither. It cannot touch plate 78 as this would cause bunching up of the spring coils and prevent operation. The flywheel 20 is kept positioned between collars 68 and 84.

When the shaft 18 rotates at a higher speed than flywheel 20, there is minimal coupling between spring wire 74 and shaft 18. If the shaft 18 should rotate at a slower speed than flywheel 20, as would happen during intermittent overload, the spring wire 74 seizes the shaft 18 forming a tight coupling and causing the shaft 18 to rotate at the same speed as flywheel 20.

Figure 3:
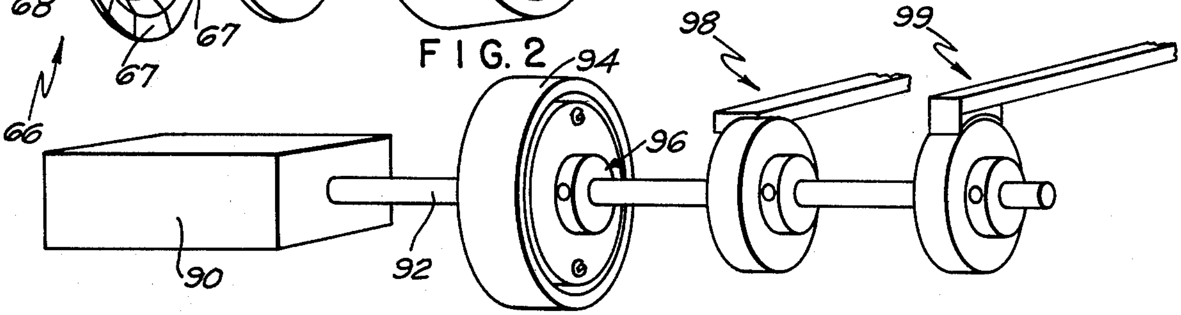
FIG. 3 shows an alternate embodiment encompassing the use of the special hub of FIG. 1.

FIG. 3 shows a second embodiment of the invention in which a prime mover 90 is coupled by means of shaft 92 to a flywheel 94 having a special hub 96, a design load shown as brake 98, and an intermittent overload shown as brake 99. The special hub 96 is identical to hub 22 of FIG. 1, and performs identical functions.

The operation is that the flywheel 94 is connected through the loose friction coupling of hub 96 during periods of no load to design load. When overload occurs and the shaft 92 speed diminishes the clutch of hub 96 engages shaft 92 to supplement the drive provided by prime mover 90.

Figure 4:
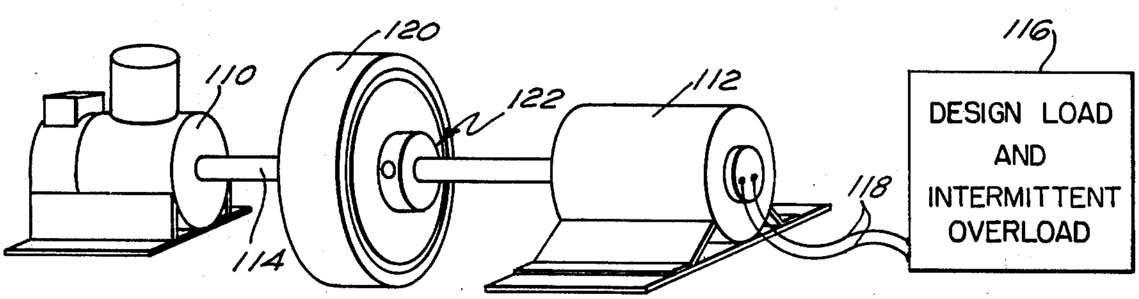
FIG. 4 shows a second alternate embodiment encompassing the use of the special hub of FIG. 1.

FIG. 4 shows an internal combustion engine 110 driving an electric generator 112 by means of a directly coupled shaft 114. The generator 112 provides an electrical output to a load and intermittent overload 116 through electrical cables 118. Such load and overload 116 could include various items such as air conditioner, power saw, air compressor, refrigerator, etc. A flywheel 120 having a special hub 122 is connected to shaft 114 between engine 110 and generator 112. The hub 122 is identical to those shown in FIGS. 1 and 2 and operates in the same manner. In the present case it would supplement the power provided by engine 110 in the case of an overload developing.

Various alternate embodiments can be visualized. For instance, the inertial element may be located on auxiliary shafting and coupled to the prime rotary power source and load by gearing mechanisms. Also other combinations of power supplies and loads may be utilized.

There has therefore been described a plurality of power systems having an energy storage device for automatically supplying power to its respective system during overloads when the primary power source is incapable of supplying sufficient power. In addition the storage device automatically disconnects itself from the system when the load returns to normal and the storage device begins storing additional power for the next overload condition.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A power driven regulated rotary system comprising:

a shaft adapted to be driven at a rotating velocity for supplying rotational power;

a variable load including an electrical power source mechanically connected to said shaft for receiving said rotational power; and a supplementary power supply, adapted for rotation, having a first coupling means connected to said shaft for slowly accelerating said supplementary power supply to shaft speed, said supplementary power supply receiving and storing energy when said shaft rotates at a velocity higher or equal to said supplementary power supply and said supplementary power supply having a second coupling means for connecting rigidly said supplementary power supply to said shaft for delivering power to said variable load on an overload by said variable load causing said shaft rotational velocity falling below the rotational velocity of said supplementary power supply, said supplementary power supply further comprises an inertial element, a slidable friction coupling device coupling said inertial element to said shaft, said slidable friction coupling device further comprises a frictional disc abutting said inertial element, and a spring finger washer frictionally abutting said friction disc and rigidly connected to said shaft, a clutch adapted to connect rigidly said inertial element to said shaft upon said inertial element rotating at a higher velocity than said shaft, said clutch further comprises a wire sping wound around said shaft and affixed to said inertial element, and a collar adapted for positioning said supplementary power supply.

2. A power driven regulated rotary system according to claim 1 wherein said inertial element is a flywheel.

* * * * *